(12) United States Patent
Kulkarni et al.

(10) Patent No.: US 8,503,037 B2
(45) Date of Patent: Aug. 6, 2013

(54) REDUCING IOP REGISTRATION ERROR IN A DIGITAL DOCUMENT SYSTEM

(75) Inventors: Rakesh Suresh Kulkarni, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 818 days.

(21) Appl. No.: 12/480,945

(22) Filed: Jun. 9, 2009

(65) Prior Publication Data

US 2010/0309526 A1 Dec. 9, 2010

(51) Int. Cl.
*G06K 15/02* (2006.01)
*G06T 5/00* (2006.01)

(52) U.S. Cl.
USPC .......... 358/3.26; 358/3.27; 358/2.1; 358/518; 358/1.12; 358/3.32; 382/162; 382/167

(58) Field of Classification Search
USPC ......... 358/3.26, 3.27; 382/260–265; 345/611; 348/241–252
See application file for complete search history.

(56) References Cited

U.S. PATENT DOCUMENTS

| | | | |
|---|---|---|---|
| 6,529,643 B1 | 3/2003 | Loce et al. | |
| 6,763,199 B2 * | 7/2004 | Conrow et al. | 399/15 |
| 6,816,269 B1 | 11/2004 | Loce et al. | |
| 7,039,348 B2 | 5/2006 | Kerxhalli et al. | |
| 7,272,334 B2 | 9/2007 | Moore et al. | |
| 8,194,266 B2 * | 6/2012 | Miyadera et al. | 358/1.14 |
| 2006/0092264 A1 | 5/2006 | Matsuzaki et al. | |
| 2006/0099019 A1 | 5/2006 | Howe | |
| 2007/0139715 A1 | 6/2007 | Kazama et al. | |
| 2008/0278735 A1 | 11/2008 | Wang et al. | |

OTHER PUBLICATIONS

U.S. Appl. No. 12/194,958, filed Aug. 20, 2008, Kulkarni et al.

* cited by examiner

*Primary Examiner* — Steven Kau
*Assistant Examiner* — Quang N Vo
(74) *Attorney, Agent, or Firm* — Philip E. Blair; Fleit Gibbons Gutman Bongini & Bianco P.L.

(57) ABSTRACT

What is disclosed is a novel method for reducing errors in IOP registration of a digital document system. In one embodiment, a number of digital pages (10, for example) are received in the image path. For each of a process and lateral direction of a first side of each digital image, a total amount of IOP registration error to be corrected is determined. A portion of the total IOP registration error is estimated that is separable error. Each of the estimated separable errors are subtracted from the total IOP registration error to obtain an amount of non-separable error in each respective direction. The non-separable error values are averaged to obtain an error value for each direction per-side. The error values are compensated for in their respective directions per-side by adjustments to the device in an amount which is equal in magnitude and in an opposite direction to the error.

6 Claims, 6 Drawing Sheets

REDUCING IOP REGISTRATION ERROR IN A DIGITAL DOCUMENT SYSTEM

TECHNICAL FIELD

The present invention is directed to systems and methods for detecting and reducing image on paper (IOP) registration error in the image path of a digital document system.

BACKGROUND

In color printing, color images are produced on a print media by repeatedly superimposing on a single print sheet different image layers or color image separations. This is typically accomplished by a process wherein subsequent image layers are formed on subsequent passes of the photoreceptor, each writing a different image layer during a single revolution of the photoreceptor (single pass) or by employing multiple exposure devices each writing a different layer on different photoreceptors. The toned developed image is then transferred from the photoreceptor(s) to paper or similar material, and the toner image is fixed by heat and pressure (fusing) to form a permanent copy.

One major cause of image on paper (IOP) misregistration is from paper shrinkage due to fuser heating or enlargement due to stretching in some fuser designs. The effect of paper shrinkage/enlargement can be reduced by implementing an electronic registration process such as Contone High Resolution Image Path Electronic Registration (CHIPER), which compensates for the misregistration error caused by fuser shrinkage/stretching by adding/removing pixels to/from the image prior to printing.

The shrinkage/enlargement can be different in different directions, and could be of different forms, such as uniform shrinkage/enlargement, or spatially varying shrinkage/enlargement. It can be categorized into uniform and non-uniform components in each of a process and a lateral (x-process) direction. Non-uniform components can be further subdivided into separable and non-separable portions. It is simpler and cheaper for the electronic registration process, such as CHIPER, to compensate for uniform and separable non-uniform error. A simple, hardware friendly design of the electronic registration process can perform well when the error is separable, i.e., the error in the process direction will be independent of the location in the lateral direction, and it does an effective job of reducing the error caused by fuser shrinkage/stretching to less than 0.05 mm. However, when an amount of residual error remains in the system after an electronic registration process, e.g. post CHIPER, the amount of IOP registration error can increase. Presently, there is a need to reduce the amount of registration error after an electronic registration process (e.g., post-CHIPER) to improve overall system IOP registration.

Accordingly, what is needed in this art are increasingly sophisticated methods for reducing the non-separable errors in IOP registration remaining in the system after an electronic registration process, such as CHIPER.

BRIEF SUMMARY

What is disclosed is a novel method for reducing the amount of non-separable errors in IOP registration on a each of a lateral and process direction (on a per side basis) in a digital document system. The present method overcomes difficulties in applying electronic IOP registration in the image path of a complex digital document system capable of single engine duplex printing to improve side 1 to side 2 registration, or multi-engine printing to improve single side color-to-color registration, or multi-engine printing to improve side 1 to side 2 registration if one side is printed on each engine. The present method effectively enables the reduction of non-separable errors in IOP registration (post-CHIPER) such that overall IOP registration in the system is improved.

In one example embodiment, the present method for reducing non-separable error in IOP registration in the image path of a digital document system involves the following. A number of digital images (10, for example) are received in an image path of a digital document system. Then, for each of a process and lateral direction of a first side of each of the received digital image the following steps are iteratively performed. First, a total amount of IOP registration error which needs to be corrected in each of a process and lateral direction for each first side is determined. Preferably, the total amount of IOP registration error (per-direction/per-side) is determined off-line and provided directly to the image path. A portion of the amount of total IOP registration error is estimated that is separable error which can be compensated for by an electronic registration process such as, CHIPER. Each of the estimated amounts of separable error is subtracted from the amount of total IOP registration error to obtain an amount of non-separable error remaining in each respective direction (for each side) of each digital image. In one embodiment, the non-separable errors calculated in each respective direction are averaged over the multiple images to obtain a mean error value for each direction (for each side). Other error values such as a mean error, a median error, a straight average, or a weighted average can be determined for each direction. The calculated error values in their respective directions (per-side) are compensated for by adjusting the device equal in magnitude and in a direction opposite to each respective error value. Adjusting the device can take a variety of forms such as, for instance, manipulating a position of a media substrate relative to a printhead; adjusting a position of the image relative to the media substrate; and adding/removing pixels to/from the digital image.

In yet another embodiment, a simulation is used to estimate the amount of separable error that can be compensated for by an electronic registration process and those estimates obtained from the simulator are used to determine the amount of non-separable error in IOP registration remaining in each of a process and lateral direction (per-side). In one embodiment, the non-separable errors are then averaged to determine an amount of a mean error for each direction. In a manner more fully described herein, the errors in their respective directions are compensated for (per-side) by adjusting the device equal in magnitude and in a direction opposite to their respective error values.

In yet another embodiment, the calculated error values in their respective process and lateral directions (per-side) are presented to a user on a graphical user interface and selectable device-specific settings are retrieved from a historical database based upon the magnitudes and directions of their respective error values. Alternatively, the error values are displayed to a user on a graphical user interface for review and selection. Upon a user selection thereof, device specific settings are retrieved from a storage device, such as a historical database, and applied to the digital document system such that the selected residual errors are compensated. Optionally, instructions are provided to a user (in a video, audio, or text format) on what adjustments need to be applied to the system to compensate for the determined error values in their respective directions. Various other embodiments have been provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
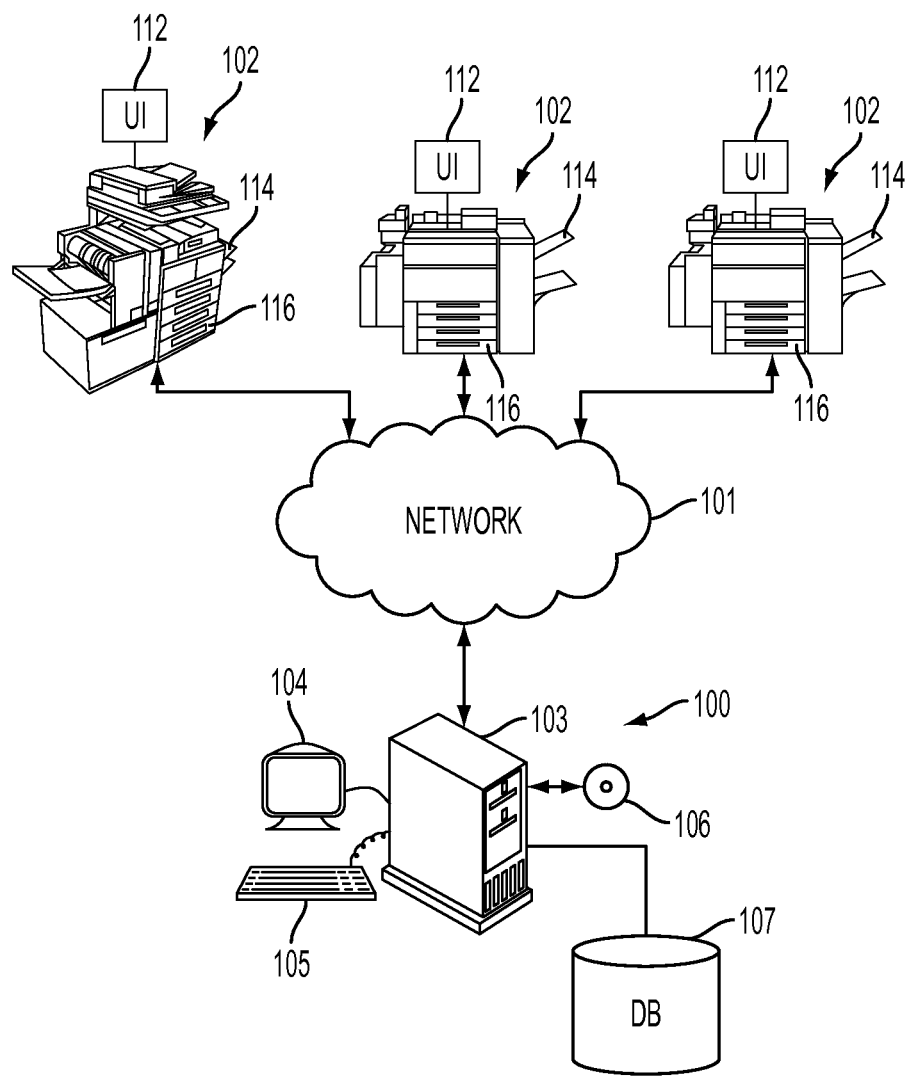
FIG. 1 illustrates one embodiment of a networked document reproduction system environment wherein one or more aspects of the present method for reducing non-separable error in IOP registration are likely to find their intended uses.

What is provided are a system and method for reducing non-separable errors in IOP registration after the electronic registration (on a per-direction/per-side basis) in a digital document system capable of single engine duplex printing to improve side 1 to side 2 registration, multi-engine printing to improve single side color-to-color registration, and multi engine printing to improve side 1 to side 2 registration if one side is printed on each engine, such that overall system IOP registration is improved.

It should be understood that one of ordinary skill in this art would be readily familiar with many facets of setup and operation of complex document reproduction systems common in print/copy job environments, IOP registration, obtaining registration measurements, and various electronic registration processes used in the image path to compensate for paper shrinkage/stretching. One of ordinary skill would also be familiar with device-specific settings and methods used to setup such systems and making adjustments thereto to compensate for errors in IOP registration. One of ordinary skill would also be knowledgeable about computer science, and software and programming systems and methods sufficient to implement the functionalities and capabilities described herein in their own document reproduction system environments without undue experimentation.

The set of complex system devices to which the present method is directed is intended to encompass digital document printers/copiers, book/magazine printing machines, newspaper production printers, digital printing presses, and other multi-function digital document reproduction systems. Such systems generally include a display such as a CRT or touch screen along with one or more user interfaces such as a keyboard, mouse, keypad, touchpad, and the like, for entering data and configuring one or more device controllers to perform a desired function. These systems generally comprise paper transport mechanisms, collators, sorters, staplers, binders, to name a few, each controlled by one or more special-purpose device controllers many of which are user-adjustable and/or user-configurable to optimize image quality and device performance. Device-specific settings include, for example, settings for sheet steering for registration control where media thickness, media weight, media type, stock size, and the like, are example parameters. One or more of these may be impacted by such parameters as ink/toner type and quality, as well as humidity, temperature, pressure, and the like. Device specific settings also are intended to include device subsystems which are adjustable. These may include, for example, ATA tip velocity control, transfer dicor control, pre-transfer dicor control, fuser temperature, and the like, which often take the form of adjustable voltage and current levels. Device-specific settings may differ from a first and second side of a given media.

LIST OF INCORPORATED REFERENCES

US. Publication No. 2008/0278735 by Wang et al., filed May 9, 2007.
US. Publication No. 2007/0139715 by Kazama et al, filed Jun. 1, 2006.
US. Publication No. 2006/0092264 by Matsuzaki et al., filed Mar. 22, 2005.
U.S. Pat. No. 7,272,334 to Moore et al.
U.S. Pat. No. 7,039,348 to Kerxhalli et al.
U.S. Pat. No. 6,816,269 to Loce et al.
U.S. Pat. No. 6,529,643 to Loce et al.

DEFINITIONS

"Image data" or ("digital image") refers to data received by an image input device which converts groups of data into pixel color values through means well established. The image data represents an idealized representation of the original document.

An "image path" is understood to be a path of an image processing system which, at a first end, receives pixels or data structures of the image, processes the pixels by performing one or more operations thereon, and provides the processed image data to one or more devices such as a print engine in the image path. The image path further incorporates or is in communication with various device control functionality of the print system. In complex multifunction devices, an electronic registration process in the image path compensates for errors in IOP registration caused by shrinkage/stretching by inserting/removing whole pixel columns/rows to/from the image.

An "image processing system" refers to a hardware or software system for processing an image data of a document received from an image input device. The image processing system preferably resides in the image path of a complex document reproduction system and may further incorporate various aspects of a color management system. Various embodiments of the present method are directed towards the image processing system placed in the image path. The image processing system can, upon receipt of measurements relating to IOP registration errors, manipulate pixels in the digital image to compensate for positioning errors such that printed images are at desired positions relative to paper.

An "image input device" is a multifunction device capable of receiving or otherwise obtaining a digital image of, for example, a document and providing the received image data to the image processing system in the image path. The set of image input devices is intended to encompass a wide variety of capture devices including cameras, photography equipment, facsimile machines, photo-reproduction equipment, and other image capturing devices. A scanner is one image capture device that optically scans images on a print media, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). A signal of the scanned image data is produced by the scanning device. Such a digital signal contains information about pixels such as color value, intensity, location, and the like, within the scanned image.

An "image output device" is a multifunction device which receives a signal of an image and is capable of reducing the signal of the image to a viewable form or otherwise communicating the received image to another device. Such communication may take the form of transmitting the image in the form of signals over a network or other communication pathway, or storing the signals to a memory or storage media. The set of image output devices includes display devices, marking devices, computer workstations, and the like. A color marking device, such as an inkjet printer, is one example image output device which renders the received signal onto a media substrate by the visual integration of colored inks deposited thereon. An image output device may incorporate some or all of the functionality of an image input device.

A "multifunction device" (or MFD), as used herein, broadly refers to devices known in the digital document reproduction arts. Such devices generally provide a user interface (UI) such as touch screen and a display such as a CRT or LCD for effectuating a human interaction with the multifunction device through user-selectable menu options displayed thereon. Many MFDs provide additional means for receiving a user input such as, for example, a keyboard, keypad, touchpad, mouse, and the like. Although a multifunction device is used herein to generally refer to document reproduction devices, it should be understood that the term is intended to encompass a wide variety of devices which can be placed in digital communication over a network with one or more computer platforms and/or with other multifunction devices for the receiving and/or transmitting of a digitized image and the manipulation of the received digital image in a manner in accordance with the teachings hereof. It should also be understood that one or more functions, features, or capabilities performed by a computer system or special purpose processor such as an ASIC capable of performing one or more aspects of the present method may be integrated, in whole or in part, with any system or sub-system or device controller of a multifunction device. One such multifunction device is a digital document reproduction system capable of single engine duplex printing, or multi-engine printing. The terms "document production" and "document reproduction" are used interchangeably and are intended to mean devices capable of scanning or otherwise receiving and printing a digital document in a print/copy job environment.

"IOP registration" refers to measurements that identify the position of a pattern or grouping of geometric shapes, such as dots, with respect to one or more positions and/or corners of the medium whereon the pattern is marked.

"IOP Registration Error" (or "Registration Error") include Raster Output Scanner (ROS) scan line bow, ROS skew, ROS magnification, lateral offset, lateral magnification of the image in a direction substantially perpendicular to the process direction, lateral margin shifts, and the like. Skew is the angle the leading edge of a sheet being transferred differs from perpendicular to the desired direction of transfer. Registration errors include lateral offsets and process errors. Lateral offset is the lateral misalignment of the sheet being transferred with respect to the desired transfer path. Typically, the base engine is designated as the first one printing the baseline of the print. The relative IOP registration error between each engine and the base engine is measured using the system's internal image quality sensor. The amount of a deviation is measured and recorded as a first offset distance relative to the first print engine. Compensating for registration errors includes correcting for divergent beam scan trajectories, correcting for beam scan offset in either a lateral or a process (fast-scan) direction, and compensating for registration errors due to non-ideal photoreceptor positioning or pixel positioning errors. Other parameters such as paper weight and composition, grain direction, coating, and size, all affect S1/S2 registration, and thus device performance and image quality. Although the present method is intended to overcome difficulties in applying electronic registration to various forms of binary images, some aspects of the present method also apply to contone images as well as halftoned images comprising gray levels.

"Separable error" is the amount of displacement error that depends on the location in its own direction. For example, a separable error in the process direction will be independent of the location in the lateral direction, i.e. $S_p(x, y) = S_p(x)$, where $S_p$ denotes the shrinkage error in the process direction and x and y are the pixel positions in the process and lateral directions, respectively. An electronic registration process can simply compensate for this separable shrinkage/stretching error by inserting/removing whole pixel columns/rows.

"Non-separable error" is the shrinkage error in either the process or lateral directions that varies in both the process and lateral directions, e.g. $S_p(x, y) \neq S_p(x)$ or $S_p(y)$. A non-separable shrinkage error in the lateral direction is a function of the lateral direction and a function of the process direction. The separable process and lateral registration errors vary in one direction, i.e. the error in the process direction varies only in the process direction.

The term "print engine" refers to a device for applying an image to print media. Print media generally refers to a usually flimsy physical sheet of paper, plastic, or other suitable physical print media substrate for images.

Active Electronic Registration

Active registration systems are used to register the sheets accurately as they move through the digital document reproduction system for the deposition of layers of colorant by the print heads. In an active registration system, a sheet passes over sensor arrays from which the sheet skew, lateral offset, and process errors are calculated. The sheet is passed through a fuser that fuses the image to the sheet. Passing a fused print to a second print engine (or come back to the same print engine for duplex printing) may lead to dehydration of the paper and, consequently, distortions. Distortion can lead to misalignment of the image portions printed in the two print engines and, even with a perfect shift and tilt registration between two engines (or 2 sides), the resulting artifact due to the misalignment may be still perceptible. Thus, between print engines (or two sides) an image processing registration operation is performed on the digital image to ensure that the sheet is well registered with an image printed by the previous print engine (or the first side). In such a process, the image printed on the sheet by the first print engine (or the first side) is sensed by an image sensing unit. The image sensing unit may comprise any type of electronic sensor including a charge coupled device (CCD) array or, for example, a full width array (or imaging bar) or an offline scanner. A CCD or full width array typically comprises one or more linear arrays of photo-sites wherein each linear array may be sensitive to one or more colors. Full width arrays typically incorporate at least three different color filters, such as red, green and blue, overlying three rows of closely spaced light sensor elements (photo-sites) to provide electrical output signals corresponding to the image. Imaging bars are typically formed by edge butting together a number of individual imaging chips, each having such multiple tiny and closely spaced photo-sites. Having the sensed position of the reference features allows for processing on the digital image in a second print engine (or side) to ensure suitable registration with the previously printed image via a controller which provides sufficient position and orientation for the registration operation. The process repeats for each of the print engines (or each of side) in the image path. In a four color printer wherein each color print engine marks the media substrate with a difference color such as CMYK, measurements are obtained at the output of a first print engine (or first side) and an amount of a correction is provided to a second print engine (or second side) by a controller unit to ensure suitable registration. The output of the second print engine is then measured and corrections applied to the third print engine by a device controller, and so forth. An electronic registration process, such as CHIPER, may be employed in the image path between each of the print engines such that an amount of compensation can be made to the image in advance of the printing of a next colorant layer by a next print engine. The second print engine, in the description above, can also represent the same print engine with the sheet going back after sheet inversion for printing on side 2. In that case, the electronic registration compensation may be applied to reduce side1-side2 registration errors.

Example Networked Environment

Reference is now being made to FIG. 1 which illustrates one embodiment of a networked document reproduction system environment wherein one or more aspects of the present method for reducing non-separable errors in IOP registration are likely to find their intended uses.

The example networked document reproduction environment is shown generally comprising a computer system 100 connected to various multifunction devices 102 over network 101. Such a networked environment may be wholly incorporated within the confines of a single print/copy center or may be distributed to many different locations throughout an enterprise network. Computer platform 100 is placed in digital communication with a plurality of multi-function devices 102 over a network illustrated as amorphous cloud 101. Many aspects of network 101 are commonly known and may include the World Wide Web. A further discussion as to the construction and/or operation of a specific network configuration or the Internet has been omitted. Suffice it to say, data is transmitted in packets between networked devices via a plurality of communication devices and links using established protocols. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

Computer platform 100 is shown comprising a computer case 103 housing therein a motherboard, CPU, memory, interface, storage device, and a communications link such as a network card. The computer system also includes a display 104 such as a CRT or LCD. An alphanumeric keyboard 105 and a mouse (not shown) provide a mechanism for the computer system to accept a user input. Computer program product 106 contains machine executable instructions and other machine readable instructions for implementing the functionality and features of the present method. Such a computer platform includes database 107 for storage and retrieval of historical data. The computer platform is capable of running a server software program (or housing server hardware) for hosting installed applications. Server software capable of hosting service applications are readily available from a variety of vendors. The computer platform may be further capable of creating and running service proxies for directing requests for applications from a client device to the platform hosting the requested application and for redirecting responses from a host device to a requesting client device. The computer platform 100 may act as a server to the processors (not shown) resident aboard a controller module residing within one or more of the multifunction devices 102. The computer platform may alternatively be any of a desktop, laptop, server, mainframe, or the like, common in the arts. Networked computer platform 100 is capable of receiving data from any of the networked multifunction devices 102 in response to the present method and providing one or more device-specific control instructions to the networked device in response to the present method having determined the mean errors in any of the process and lateral directions for any of a first or second side of the received digital image, in accordance with the present method. Special purpose program instructions loaded thereon cause a central processor of the computer to make any of the determinations or calculations, discussed with respect to the flow diagrams hereof, and provide the user with selectable menu options regarding error magnitude and direction and make recommendations for adjustments to be made to the networked multifunction device based, in part, on data stored in the historical database 107.

In the embodiment shown, computer system 100 implements database 107 wherein various records are stored, manipulated, and retrieved in response to a query. Although the database is shown as an external device, the database may be internal to computer case 103 mounted on the hard disk therein. Records stored in the database can be retrieved, modified, and updated by computer platform 100 or, additionally, by any of the multifunction devices 102 which have been placed in communication with historical database 107. A record is any data structure capable of containing information which can be indexed, stored, searched, and retrieved by a database engine in response to a query. Such constructs are well established in the software and database arts. The database is one known in the arts capable of indexing a plurality of records, receiving and interpreting a query, and retrieving one or more of the appropriate records in response to the query. The database is also capable of adding new records and updating existing records. Since database construction, optimization, indexing, and record retrieval techniques are well known, a further discussion as to a specific database implementation is omitted. One of ordinary skill would be able to readily acquire and implement a database to store, index, and retrieve records in response to a query.

Multifunction devices 102 are shown including a user interface (UI) 112 for the display thereon of icons and other selectable menu options and displayed information in response to an operation of the present method. The graphical UI includes a touch screen display for receiving user input via a touch-sensitive surface, and may further include any of a keyboard, keypad, mouse, touchpad, and the like. A display on the multifunction device is one of many possible displays retained in a memory associated with a user interface, including device-specific settings for instructing a control unit to adjust the multifunction device to reduce the IOP registration in accordance herewith. The user interface includes controls for programming a range of values therefrom for carrying out various embodiments of the present method. The user interface further includes controls for programming the specific system settings to configure any of the networked multifunction devices to perform various aspects of the present method in accordance with the teachings hereof. In the embodiment shown, the multi-function devices 102 include a tray 114 for document input, and paper trays 116 for retaining a variety of print media. Such devices are capable of performing a print/scan/copy job function as is generally known in the digital document arts. One or more of the multifunction devices 102 further incorporates various features, capabilities, and functionality of scanner device for scanning a document into a digital image, in a manner which is well known in the arts.

The computer platform 100 and the plurality of multifunction devices 102 collectively form a subnet. Techniques for placing computers in network communication with digital devices are well established. Therefore, a further discussion as techniques for placing such systems and devices in network communication has been omitted. The computer platform and the multifunction devices 102 each includes a network interface card (not shown) which facilitates the transmission of data over network 101. Any of the networked devices may include an Ethernet or similar card to connect to network 101 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. One or more of the multifunction devices may also be place in digital communication with one or more of the other devices in the network depending on the desired configuration and the objectives of the end-user hereof. The various print/copy/scan devices of the document reproduction environment may also include processors capable of executing program instructions incorporating one or more aspects and/or feature enhancements of the present method. One or more of the multifunction devices 102 can be placed in digital communication with the database of 107 over network 101.

It should be appreciated that various aspects of the present method may very well be implemented on the computer platform in communication with the multifunction device whereon IOP registration is intended to be improved in accordance herewith. Information obtained by the multifunction device wherein the present method is implemented may be transmitted to the computer platform or to one of the other multifunction devices. Device-specific settings may be automatically retrieved from the historical database 107 either by the multifunction device or the computer platform based upon, at least in part, the magnitude and the direction of the mean error determined for each of a process and lateral direction for a given side (or after each engine). The retrieved record may contain a location of one or more device-specific settings and/or instructions thereon which will be specific to correcting the mean error determined in any of a process or lateral direction as is described herein in further detail. The record may point to a location in memory or storage where machine executable instructions or device-specific executable programs reside. When executed, these program instructions cause one or more device controllers in communication with one or more components of the multifunction device to make a specific adjustment. An application of the device-specific settings, either performed automatically by a processor or performed by a key operator causes the multifunction to reconfigure itself to compensate for the selected mean error in its respective direction.

Example Flow Diagram

Although the example flow diagram is described with respect to a process occurring on a first side of an image of a digital document, it should be appreciated that the present method is equally applicable to a second side of the received image. In other embodiments, the present method is performed on a first and second side of the received digital image by a digital document system capable of performing aspects of the present method for reducing non-separable errors in IOP registration in either a duplex mode or by a $2^{nd}$ engine or $2^{nd}$ side. Such a system would be able to scan both a first and second side of the digital image and take measurements thereof on a per-side basis. The following flow diagram is therefore not to be construed as limiting.

Figure 2:
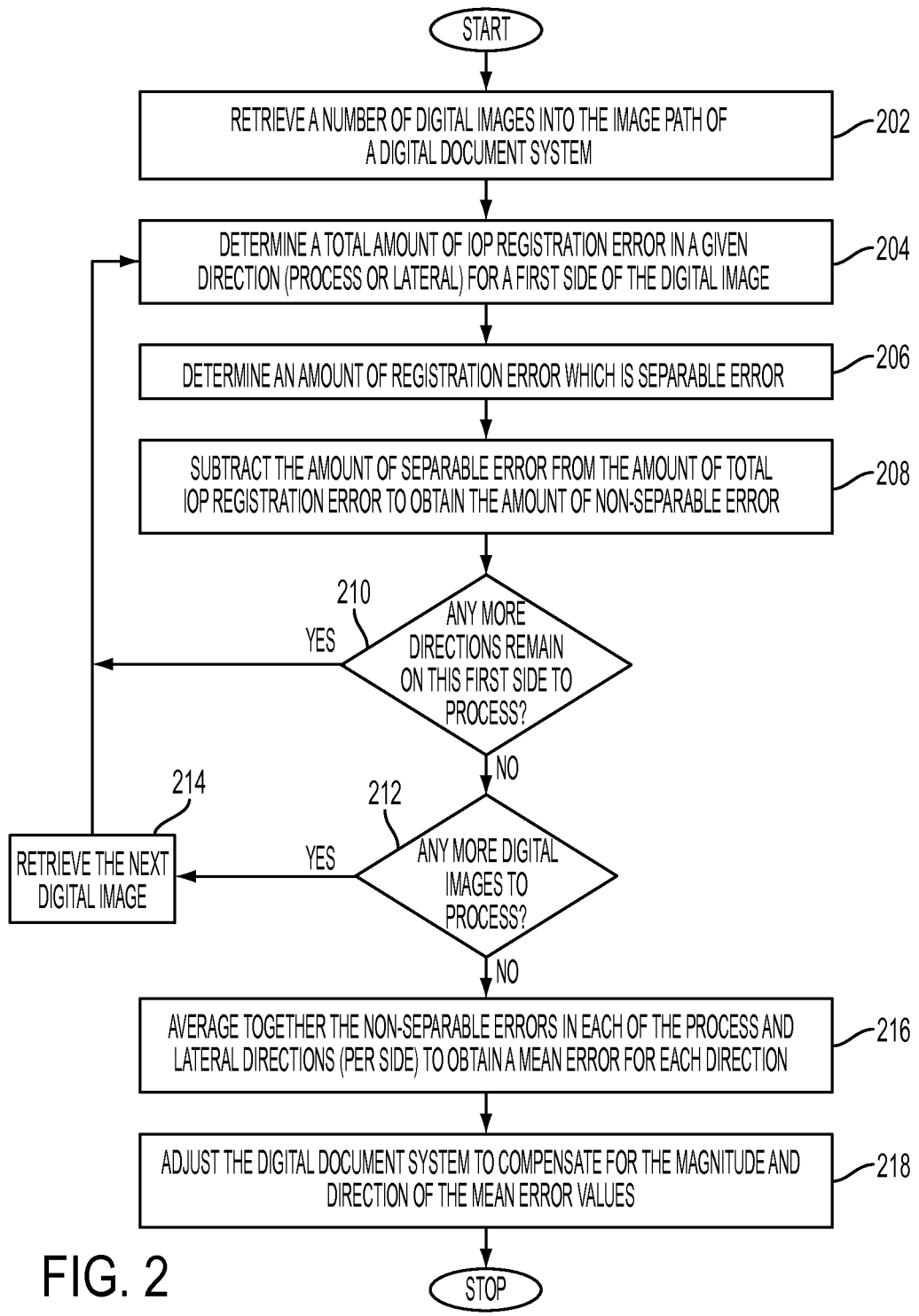
FIG. 2 is an example flow diagram of one embodiment of the present method for reducing non-separable errors in IOP registration in the image path of a digital document system.

Reference is now made to the flow diagram of FIG. 2 which illustrates one example embodiment of the present method for reducing non-separable errors in IOP registration in the image path of a digital document system.

Figure 3:
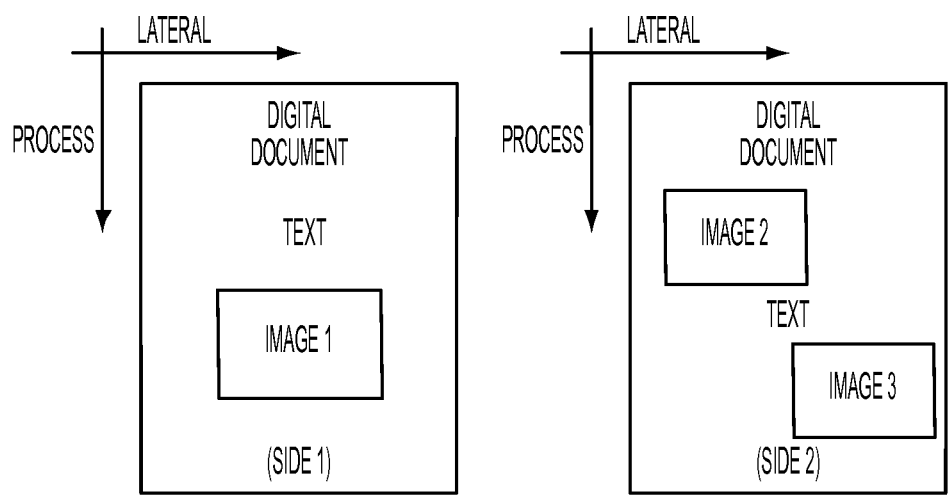
FIG. 3 shows an example first and second side of a document with various text and image content thereon to illustrate the process and lateral directions of a received digital image.

At 202, a pre-defined number of digital images are retrieved into the image path of a digital document system. The number of digital images is intended to be a small number such as, for example, 10 pages. An example document containing text and image content is shown with respect to FIG. 3. The process and lateral directions of each of a first and second side of the document are also shown for reference. Pages of the document can be received using an image input device such as a document scanner. A digital representation of the document can be communicated to the digital document system using, for instance, a facsimile transmission device. The document may comprise a source photograph which is captured via a camera or other photographic device and the image data transferred via a cable over a network. The received image data generally comprises a plurality of pixels having color values which have been converted to a digital form. Image data can be read from a memory device such as a floppy disk or a compact disk. The digital images may be test pages containing patterns such as centroids and dots. The received digital images may be pages from a customer's print/copy job containing text, graphics, photos, and the like.

At 204, an amount of total IOP registration error is determined in a first direction of a first side of the received digital image using the image sensing unit of the digital document system. This error can be determined in a plurality of ways. In one embodiment, an electronic registration process, such as CHIPER, is turned OFF in the image path and the total amount of IOP registration error in the system is determined by using the image sensing receptors of the device's image sensing unit after each print engine (or side) has marked the media substrate with its respective colorant and making comparisons with the ideal image as received and adding together the individual registration errors per-engine (or per-side) to obtain an amount of total IOP registration error. Alternatively, the image is printed with all of the print images and final measurements obtained from the image print using the device's image sensing unit post-printing. The differences between the final measurements taken and the ideal original source image are then used to determine the total amount of IOP registration error in the system. Alternatively, the total IOP registration error in the system is known or otherwise retrieved from a database or entered by a key operator of the device. The total IOP registration error may also be determined from printing a test pattern in advance of an execution of the present method. Obtaining the amount of total IOP registration error for a given system will depend on the complexity of the multifunction device. It will also depend on the complexity and location of the image sensing unit employed in the device.

Imaging sensing units having image sensing receptors are known in the arts. Mechanisms incorporated into a wide variety of digital document systems, such as those shown in the networked environment of FIG. 1 and the multifunction device of FIG. 4, accurately obtain measurements for one or more objects contained in an image print for subsequent comparison with the ideal image. In some systems, a sheet having a test pattern defined by a grid of dots substantially covering the sheet is run through the image path of the digital document system. Image features, such as text, graphical objects, edges of pictures, structures such as corners of text, centroids or other graphical objects, skeletal representations, or other spatially distinct image content of the digital documents themselves may also be used to determine an amount of IOP registration error. Relative positional relationships of image feature(s) selected for this purpose can be communicated to one or more device controllers which sense these features on the printed page and provide feedback which is used by special purpose processors to compare relative positions of the selected image features with positions of these features in the original source image. Thereafter, the existence and amount of any offset difference can be determined and a magnitude and a direction of the registration error calculated. Test patterns may also include one or more fiducial marks as are known in this industry. Teachings in this regard are provided in some of the commonly owned and assigned US references listed at the beginning of the detailed description hereof, which are incorporated herein in their entirety.

At 206, an amount of the total IOP registration error which is separable in the first direction (process or lateral) is determined. As discussed in the background section hereof, fuser shrinkage can be categorized into uniform and non-uniform components in each of a process and lateral direction. Non-uniform components can be further sub-divided into separable and non-separable portions. An electronic registration process, such as CHIPER, compensates for uniform and separable non-uniform errors caused by fuser shrinkage or stretch in some fuser designs. With the electronic registration process, such as CHIPER, turned ON (or active) in the image path of the digital document system, the amount of error compensated for by CHIPER can be either provided by CHIPER or estimated by CHIPER and provided as an output signal therefrom. Image sensing units (inline or off-line) in the image path of the digital document system have an array of photosensors to scan the image print and obtain measurements therefrom. The obtained measurements are used to determine the amount of total IOP registration error in the system or the amount of error post-CHIPER. The printed sheet passes over the array of photosensors in the image sensing unit which scan the sheet to determine a location of a leading edge. The photosensor array determines the distance of the leading edge relative to a common reference point. Systems typically measure Side1-Side2 IOP registration using a coordinate system that applies a common reference (fixed point) to one or both sides of the sheet. For example, a leading edge of the sheet can be detected and used as the reference edge and as a first axis of the coordinate system (process direction). A second axis, top edge of the coordinate system, is determined by measuring a perpendicular drawn to a corner of the leading edge (cross-process direction). The leading edge of the first side (S1) will also be used as the leading edge of the second side (S2). Both sides of the sheet are measured with respect to the same leading edge. Based on these differences and coordinates obtained therefrom, a magnitude and a direction of an amount of error can be determined in each of a process and lateral direction. Alternatively, a simulation program is used to determine an amount of separable error compensated for by a given registration error compensation process, such as CHIPER. The estimates provided by the simulator are then used.

At 208, each of the estimated amounts of separable error is subtracted from the total IOP registration error to produce an amount of non-separable error for a first direction. The first direction can be one of a process or lateral direction given with respect to an orientation of the received image.

At 210, a determination is made whether any more directions (process or lateral) remain on this first side for which an amount of non-separable error needs to be calculated. If so, then processing repeats with respect to step 204 for a second direction of the first side of each of the received digital images wherein an amount of non-separable error is calculated for the second direction of the first side. In another embodiment, the amount of non-separable error is determined for a first and second direction for a second side of each of the received digital images such that an amount of non-separable error for each direction of the second side can be determined. The method of determining the error per side can be performed serially or in parallel depending on the sophistication of the system wherein various embodiments hereof find their implementation.

At 212, a determination is made whether there are any more digital images remaining to be processed. If so, then at 214 the next digital image is obtained and processing repeats with respect to step 204. If not, then the non-separable error has been determined for each direction for the first side of each of the received digital images. After all the non-separable errors have been determined in each direction (for each side), processing proceeds with respect to step 216.

At 216, the non-separable error calculated for each digital image in each respective direction (per side) are, in one embodiment, averaged together to produce a mean error value for each respective direction (per side). The mean error represents the amount of residual error remaining in the system after the separable error has been compensated for by the electronic registration process, such as CHIPER or, for example, by a simulation program. At this point, on a first side, a total of 2 mean error values (1 per direction) have been obtained. If both sides of the digital image are processed in this above-described manner then, at this point, a total of 4 mean error values will have been obtained (1 each per direction per side). It should be appreciated that 2 or more mean error values on each side can be returned. For example, in addition to the 2 dc (offset) mean error values in process and lateral directions on each side, other embodiments hereof use an average skew error found on each side. The skew error can then be compensated in the image path at a later point. Other forms of error values such as, for instance, a median error or a straight (or weighted) averaging can alternatively be performed.

At 218, the digital document system is adjusted to compensate for the mean errors calculated for each of the process and lateral directions (per-side). The amount of adjustment is equal in magnitude and in a direction opposite to the error value. In one embodiment, the adjustment takes the form of manipulating a position of a media substrate using a device controller in communication with the print engine whereon the first side of the digital image is to be printed. The adjustment may take the form of manipulating, in memory, a position of the digital image relative to the media substrate relative to the location of the printhead. The adjustment may take the form of manipulating pixels of the digital image in memory by adding pixels to the digital image and/or removing pixels from the image. Skew can be corrected in some registration systems by initiating a signal to a device-specific controller to rotate drive rollers on opposite ends of a common drive axis at different velocities. Lateral offset may be corrected by moving the rollers in unison to one side or another. Process errors may be corrected by driving the rollers faster or slower. Upon registration error compensation, the sheet whereon the digital image is to be printed is aligned along a desired transfer path and delivered to an imaging station where an image is created on the surface of the sheet in the proper registration. Alignment of a second and third print engines relative to the first print engine can be performed in parallel. Aligning can be accomplished using different methods such as physically manipulating the print engine frame; manually adjusting the print engine's image forming apparatus; or adjusting the nominal document position during image receipt. Many complex document reproduction systems have device-specific parameters which can be configured by a key operator to effectuate an adjustment of the device by machine setup. Thereafter, the process of the embodiment ends.

It should be appreciated that the present method is applicable to digital document systems capable of single engine duplex printing to improve side 1 to side 2 registration, multi-engine printing to improve single side color-to-color registration, multi engine printing to improve side 1 to side 2 registration if one side is printed on each engine, as well as heretofore unknown digital document systems and other multifunction devices which may arise in a networked print/copy job environment during the statutory term hereof.

Database Records

In order to facilitate an adjustment of the digital document system to compensate for the determined amount of residual error, one or more records are retrieved from a database associated with the multifunction device whereon the present method is performed. The retrieved record is associated with the determined error value(s).

Figure 4:
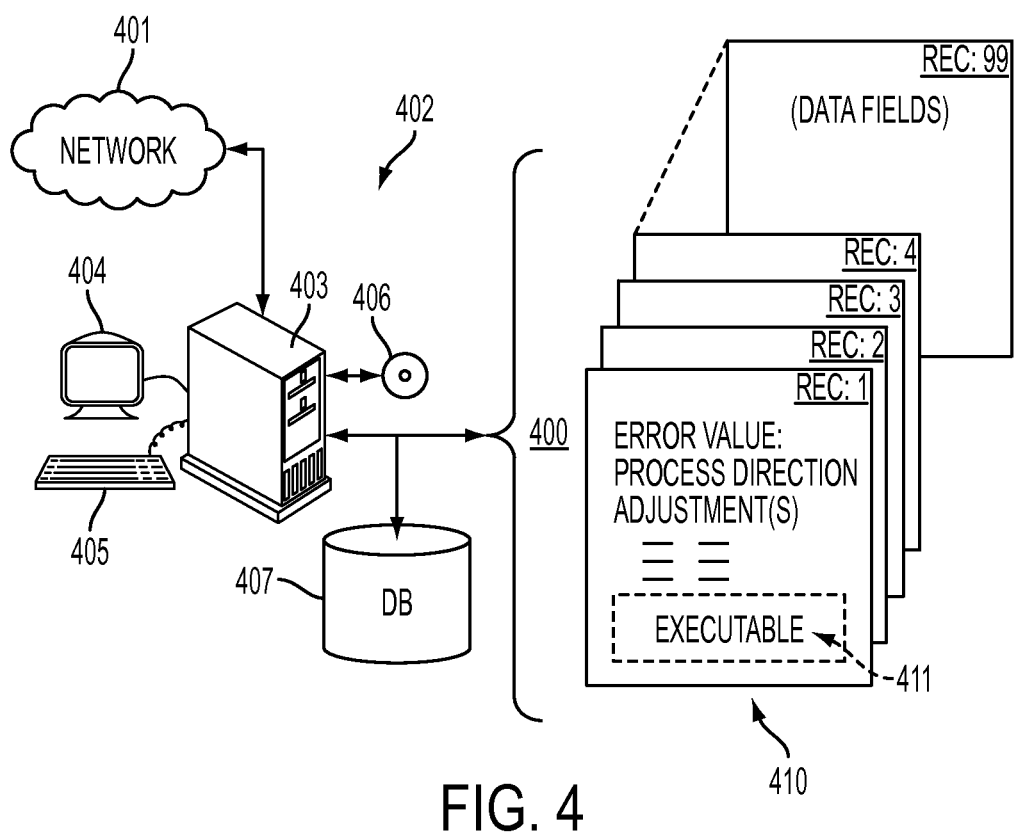
FIG. 4 illustrates a plurality of records stored in the example historical database of FIG. 1 and containing device-specific settings and other data, instructions, and recommendations which are intended to facilitate an adjustment made to a digital document system in accordance with the embodiment described with respect to the flow diagram of FIG. 2.

Reference is now being made to the embodiment of FIG. 4 which illustrates a plurality of records containing device-specific settings stored in the historical database 407 shown associated with computer workstation 402. An example plurality of records, collectively at 400, are stored in database 407 which is placed in communication with computer workstation 402 and network 401. The computer platform of FIG. 4 is a representative of the computer 100 of FIG. 1. The example computer system shown has a computer readable medium 406 for storing machine readable instructions for implementing various aspects hereof and for storing or transferring records to/from the computer platform. The records can be stored in the database or in a memory or on a hard drive internal to computer case 403. The retrieved record can contain machine executable instructions for the implementation of device-specific settings and/or recommendations for adjustments which automatically perform the compensations necessary to reduce the error determined for a given direction for a given side.

In the illustration, there are 99 records in sequential order. It should be appreciated that the number of stored records and their order in the database is intended to be illustrative. Each of the records has a numerical sequence associated therewith (REC 1 . . . REC 99). The numerical sequence is preferably unique to each record and thus can be used for record identification. Alternatively, it can be a randomly generated alpha-numeric character sequence which is then associated with the current record and generated at the time the record is created and stored. Example record 410 corresponds to a mean error value calculated for a process direction. Record 410 further stores recommendations for adjustments to be made to the device to correct for the error value in the given direction. The record may further store one or more device-specific settings for performing the necessary adjustment to the device to compensate for this particular error value. The device-specific settings may take the form of an executable program 411, a location of which is referenced by the record itself. An operating system would retrieve the record, fetch the referenced executable program (or device driver), and automatically execute the program to make the adjustment. Alternatively, the adjustment is performed upon a user selection. Another record in the database, for example REC2, would store a mean error value and a process or lateral direction associated with that error value. REC2 would further store one or more recommendations or instructions for making the necessary adjustments for correcting for that error. That record may further reference one or more executable programs stored in memory or on a storage device which, when executed, signal device controllers on the multifunction device to make an adjustment to the device. The reference executable program may make a correction to the image data itself by, for example, adding/removing pixels to/from the image data. Other means for manipulating the image or for manipulating the device to compensate for the determined error values in one of a process or lateral direction (or both) for each side are intended to fall within the scope of the appended claims. It should be appreciated that the records shown are illustrative.

Any of the determined mean error values and their respective directions (process or lateral) per-side and any data or measurements used by the present method may further added to one or more records and stored to the historical database for subsequent retrieval and analysis. Comment fields in the record may further store helpful hints/tips by other device operators which they have entered using, for example, the graphical user interface of FIG. 5. In such a manner, the amount of historical data continues to grow as more and more records are added. Using the data stored in the historical database, designers can analyze trends and other data to determine the efficacy of certain adjustments made to the system. Executable programs which are specific to one or more device controllers can be developed, tested, and stored in a record (or reference by a record) for execution to compensate for certain types of errors for a specific error value in a given direction or for a range of error values for a plurality of directions for each side. A central database of adjustments can be developed and brought online. Key operators and customers of networked multifunction devices (as shown in FIG. 1) can retrieve the adjustments they need to make to compensate for the non-separable errors in IOP registration for their respective systems. Upon retrieval of the reference executable programs from online or stored locally, adjustments can be made to the device either automatically or upon a user selection from a graphical user interface. Design changes, features, and enhancements to complex digital document systems can be effectuated as a result of an implementation of the present method.

It should be appreciated that the records may contain additional fields, formats, structures, pointers, comment fields, references, and the like. Various embodiments of FIG. 4 or the means for storing information for making adjustments to a multifunction device in accordance herewith are intended to fall within the scope of the appended claims.

Example Graphical User Interface

As discussed, one or more records associated with a magnitude and a direction the generated error value are retrieved from a database either local to the multifunction device or remotely with a computer workstation in network communication therewith. Records retrieved which are associated with the obtained error values (per direction) contain device-specific adjustment settings or instructions which, when applied to the multifunction device either automatically or manually by a user, perform an adjusted thereto which is equal in magnitude and in an opposite direction to the error. The user, using the graphical user interface, may select the adjustments to be applied. In an alternative embodiment, the user is provided with the error values determined for each respective direction (per-side) on a graphical user interface of the multifunction device. Alternatively, a magnitude of the error values and their respective directions are communicated over the network (of FIG. 1) and displayed on the display 104 of computer platform 100 for a user or a customer.

Figure 5A:
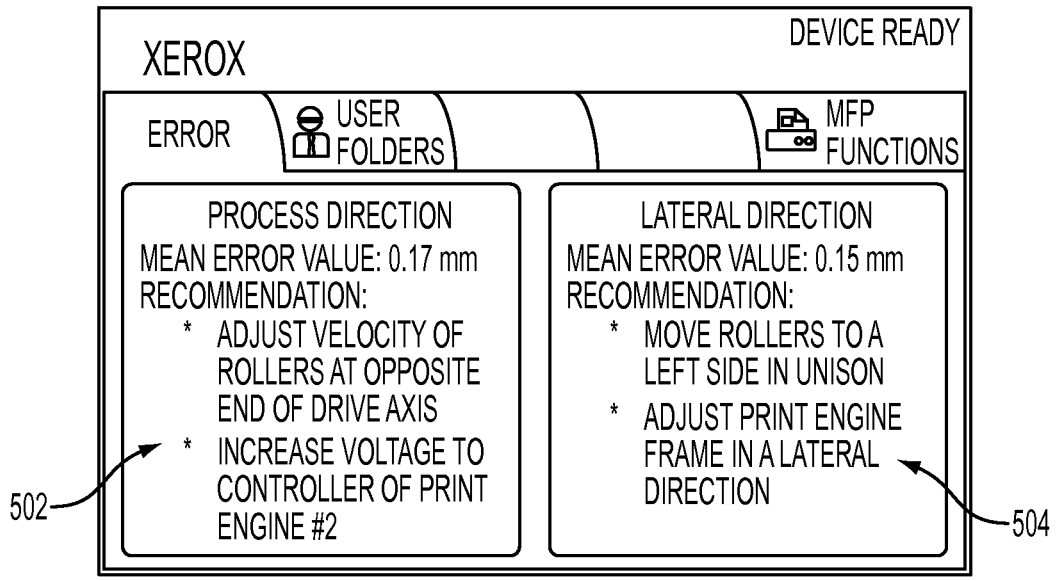
FIGS. 5A and 5B illustrate one example embodiment of a graphical user interface of one of the multifunction devices of the networked environment of FIG. 1 having displayed thereon various selectable menu options along with error values and their respective directions along with recommendations for adjustments to be applied to the device to compensate for the determined error values.

Reference is now being made to FIG. 5A which illustrates example embodiment of a graphical user interface of one of the multifunction devices of the networked environment of FIG. 1 having displayed thereon various selectable menu options along with information retrieved from the associated database record such as the error values and their respective directions (for each side) along with recommendations for adjustments to be applied to the device to compensate for the determined errors. The menu screen displayed would appear on any of the UI 112 of the multifunction devices 102 of the networked environment of FIG. 1 or on the computer platform of FIGS. 1 and 2.

In the embodiment of the UI display shown, there are a plurality of example selectable tabs. Under each of the tabs may be one or more selectable icons for performing various other features, enhancements, and embodiments hereto. The device's programmable touch screen display can assume a variety of formats having, for instance, menus, tabs, options, buttons, icons, data entry portions, and the like. The browser on the device manages many of the displayed features. Each icon may be configured to provide a visual representation of the selection option. Alphanumeric text may also be associated with displayed icons. Other icons on the touchscreen UI would be associated with service applications developed to perform other functions for manipulating various features and functionality of the multifunction device that a key operator would find useful including manipulate the image data. It will be appreciated that selection of any of the service icons may alternatively bring up other pages whereon other icons appear.

In FIG. 5A, shown is a displayed portion of a first and second record which have been retrieved from the database 407 (of FIG. 4) associated with an error value in each of a process and lateral direction for a first side. As shown, the display portion of the screen is divided into two portions, a process 502 and a lateral 504 portion. On the left portion of the display screen is displayed the mean error value for the process direction which has been calculated in a manner in accordance with the present method as described, in one embodiment, with respect to the flow diagram of FIG. 2. On the right portion of the display screen is displayed the mean error value associated with the lateral direction for a first side of the digital image. For each direction are also displayed a plurality of recommendations which have been retrieved from the database. Although the recommendations shown on the display screen of the graphical user interface of FIG. 5A are in text format, these may be selectable icons or sub-menus which may provide the key operator or a service technician of the device with additional options or instructions for further adjustments that can be made to the device. The instructions provided to a user may take the form of a video, audio, or text format. One or more of the options may be selectable. Once selected, one or more executable programs, as referenced by the associated database record, are retrieved and executed by the machine such that device controllers on the multifunction device make the necessary adjustments. Alternatively, a text screen allows the operator or technician to add comments and other helpful tips/tricks for making certain adjustments to the device which, when stored on a central historical database and subsequently retrieved by another device operator having a similar error value to compensate for, may find useful or helpful. In such a manner, records and information contained in the records continues to expand.

Figure 5B:
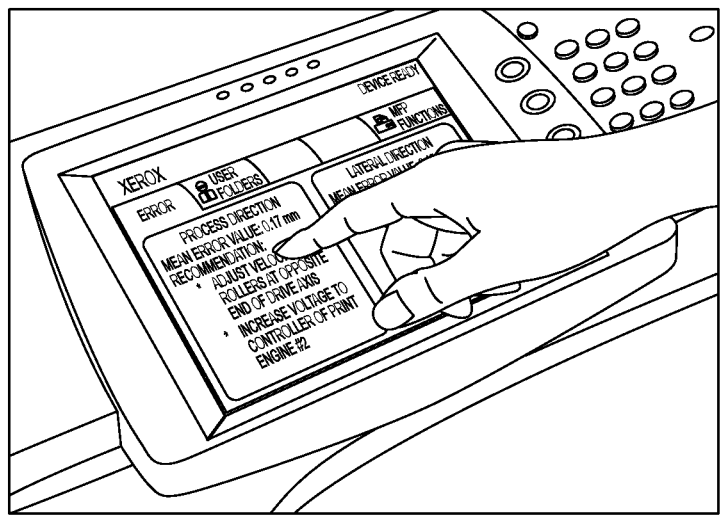

FIG. 5B shows the touch screen of FIG. 5A displayed on an MFD whereon the user selects the desired service by physically touching the appropriate icon on the MFD's touch-sensitive display. With such an embodiment, the user can navigate through a hierarchy of selectable menu options and select the device-specific settings to implement in order to compensate for the amount of adjustment which needs to be made to the device to correct for the error(s). The user may select an option to modify, update, upload or download any of the records of the historical database of FIG. 4.

Various Embodiments

Figure 6:
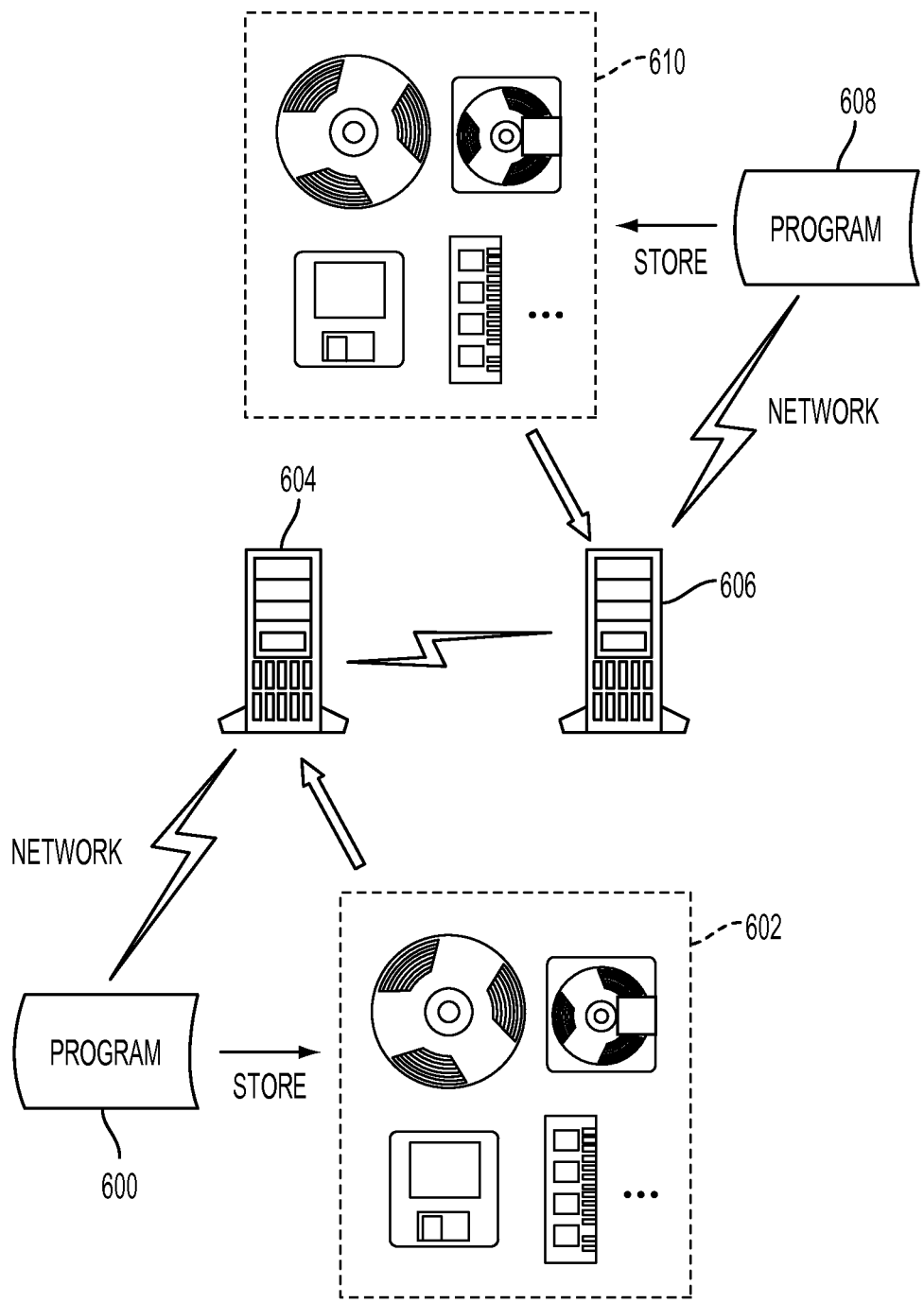
FIG. 6 is an explanatory diagram illustrating one example of a computer readable storage medium capable of storing machine readable instructions which, when mounted on a computer or a special purpose computer system, causes the system to perform one or more aspects of the present method as described above.

Reference is now made to FIG. 6 which is an explanatory diagram illustrating one example of a computer readable storage medium capable of storing machine readable instructions which, when mounted on a computer or a special purpose computer system, causes the system to perform one or more aspects of the present method as described above with respect to the flow diagram of FIG. 2 as claimed.

The machine readable instructions may be modified by one computer and transferred to another computer or multifunction device. In the illustrated embodiment, one or more computer programs 600 for carrying out the present method are loaded on a computer-readable storage media 602 which includes media such as optical disks (CD-ROM etc.), magnetic disks, magnetic cards, memories (including IC cards and memory card). The storage media stores the machine readable program instructions for transport and storage by changing magnetic, optical, and/or electric energy states or orientations in response to program instructions having been transferred to the media. The computer programs containing machine executable instructions of the present method can then be mounted on computer 604 and transferred or otherwise communicated to computer 606. The program instructions can then be off-loaded to another computer readable medium 608, in original form or modified, including data, and stored on storage media 610. Both of the computer systems include processors capable of executing machine readable program instructions.

One or more aspects of the present method can be implemented on a special purpose computer system. Such a special purpose system may be any of a micro-processor or microcontroller, ASIC, electronic circuit, or hardware designed to effectuate any aspect of the present method. Such a special purpose computer can be integrated, in whole or in part, with any of the multifunction devices of FIG. 1 or as part of the computer platform shown and discussed with respect to FIGS. 1 and 2. Further, such a special purpose computer may be responsible for managing the displays shown and discussed with respect to the example user interface of FIG. 5. Such a special purpose computer would include a processor and a main memory capable of storing machine readable instructions and may include random access memory to support reprogramming and flexible data storage. The main memory may further incorporate one or more buffers to store or transfer data. The computer system may also include a secondary memory such as a hard drive and/or a removable storage unit such as a floppy disk, magnetic tape, optical disk, etc., to store software, data, and other machine readable instructions. The secondary memory may also include additional mechanisms which help effectuate the loading/unloading of computer programs or other machine instructions for execution or for making device-specific adjustments to one or more controllers of the multifunction device to compensate for the determined error(s). A removable memory such as an EPROM, or PROM, and associated socket, flash memory, and other units and interfaces allow the transfer of files and data to the system. The special purpose computer may additionally include a communications interface that allows files and data to be transferred to external devices such as the database 4027 of FIG. 4. Example communications interfaces include a modem, a network interface such as an Ethernet card, a communications port, a PCMCIA slot and card, etc. Data transferred via the communications interface are in the form of signals and may have the form of, for example, electronic, electromagnetic, optical, or other signals capable of being transmitted and received via a communications path configured to carry such signals. Such a path may be include wire, cable, fiber optic, phone line, cellular link, RF, or other channels.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagram hereof is intended to be illustrative. Other operations, for example, may be added, modified, enhanced, condensed, or consolidated. Variations hereof are intended to fall within the scope of the appended claims.

The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for reducing non-separable error in image on paper (IOP) registration in the image path of a multifunction device, the method comprising:
   receiving a pre-defined number of digital images into an image path of a multifunction device;
   receiving an estimated amount of separable error that can be compensated for by an electronic registration process;
   for a first side of each digital image:
     for each of a process and lateral direction for said first side:
       determined an amount of total IOP registration error in each respective direction; and
       subtracting said received estimated amount of separable error from said determined amount of total IOP registration error to obtain an amount of non-separable error for each respective direction;
   calculating over said number of digital images, an average amount of non-separable error for each of said process and lateral directions; and
   adjusting said multifunction device to compensate for said average amount of non-separable error, said adjusting comprising:
     retrieving at least one device-specific setting based upon a magnitude and a direction of said average amount of non-separable error; and
     applying said device-specific setting to said multifunction device such that said device is adjusted to compensate for each respective average error value in each of a process and lateral direction.

2. The method of claim 1, wherein said average error value comprises any of: a mean error, a median error, a straight average, and a weighted average of said non separable error for each direction of said first side.

3. The method of claim 1, further comprising outputting at least one of said error values to any of: a graphical user interface, a storage device, a memory, a remote device over a network, and a historical database.

4. A system for reducing non-separable error in image on paper (IOP) registration in the image path of a multifunction device, the system comprising:
 a memory and a storage medium; and
 a processor in communication with said storage medium and said memory, said processor executing machine readable instructions for performing:
  receiving a pre-defined number of digital images into an image path of a multifunction device;
  receiving an estimated amount of separable error that can be compensated for by an electronic registration process;
  for a first side of each digital image:
   for each of a process and lateral direction for said first side:
    determined an amount of total IOP registration error in each respective direction; and
    subtracting said received estimated amount of separable error from said determined amount of total IOP registration error to obtain an amount of non-separable error for each respective direction;
   calculating over said number of digital images, an average amount of non-separable error for each of said process and lateral directions; and
  adjusting said multifunction device to compensate for said average amount of non-separable error, said adjusting comprising:
   retrieving at least one device-specific setting based upon a magnitude and a direction of said average amount of non-separable error; and
   applying said device-specific setting to said multifunction device such that said device is adjusted to compensate for each respective average error value in each of a process and lateral direction.

5. The system of claim 4, said average error value comprises any of: a mean error, a median error, a straight average, and a weighted average of said non separable error for each direction of said first side.

6. The system of claim 4, further comprising outputting at least one of said error values to any of: a graphical user interface, a storage device, a memory, a remote device over a network, and a historical database.

* * * * *